Aug. 25, 1942.  A. M. SIGNALNESS  2,293,771
CARGO SLING HOOK
Filed July 1, 1941
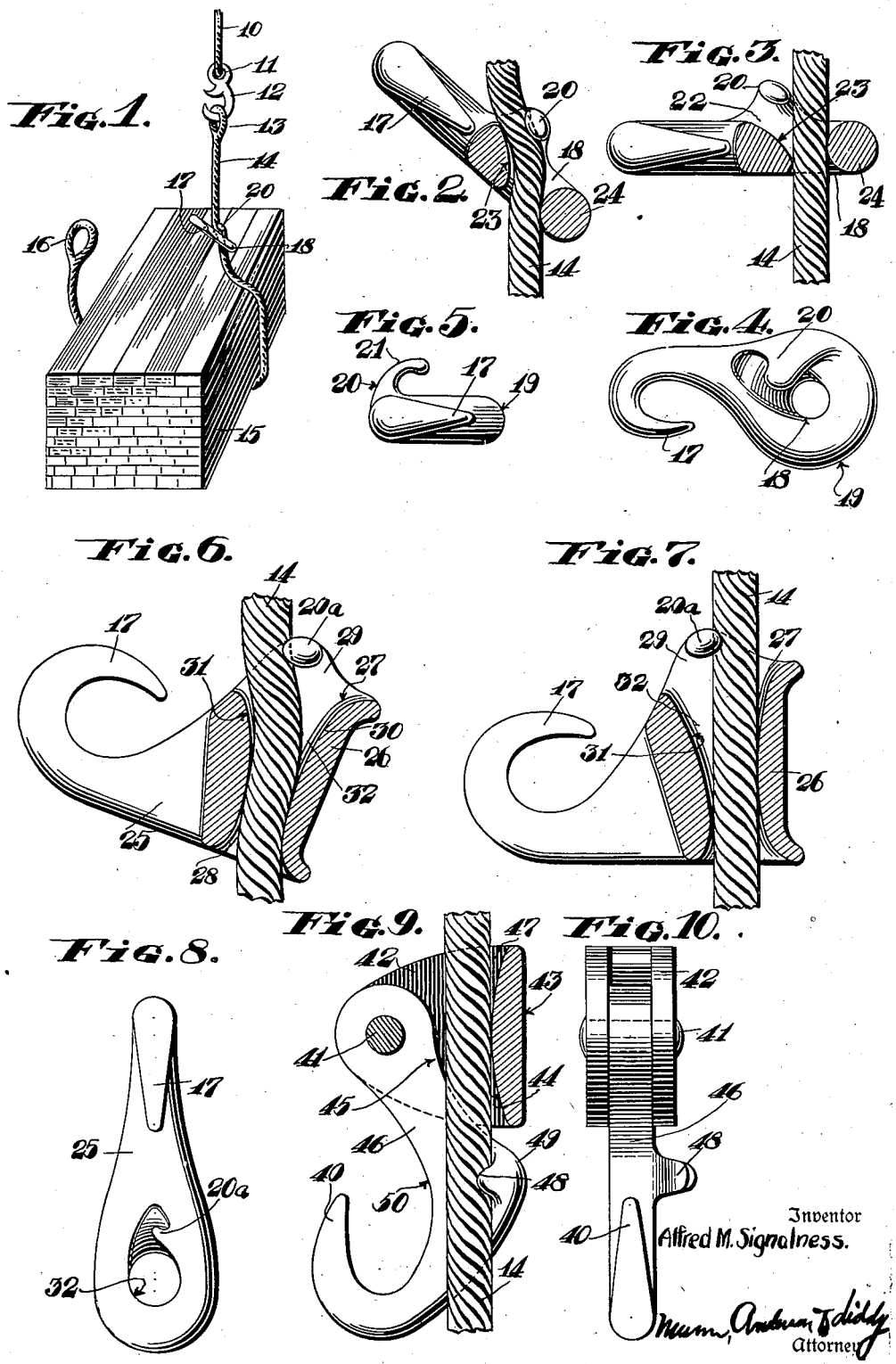
Inventor
Alfred M. Signalness.
Attorney Patented Aug. 25, 1942

2,293,771

UNITED STATES PATENT OFFICE 2,293,771

CARGO SLING HOOK

Alfred M. Signalness, North Bend, Oreg.

Application July 1, 1941, Serial No. 400,695

5 Claims. (Cl. 294—74)

This invention relates to cargo sling hooks.

It has been proposed to provide sling hooks which have a passage to receive a rope or cable at one end, but when the cargo has been removed and the rope or cable has become slack the hook will slide down to the end of the rope so that it is necessary each time to push the hook back in position before it can be placed in an operative position. Frequently these hooks slide down below the cargo or crate during the attempted application of the sling so that it will be necessary to raise the crate or other object in order to release the hook.

It is an object of the present invention to provide a hook which may be placed on the sling and when left unattended will remain in an elevated position for ready application to a loop at the free end of the sling.

Another object of the invention is the provision of a hook having an eye to receive the cable forming the sling with means in close association with the eye for gripping the cable and preventing slippage of the hook so that the hook will remain in an elevated position for application to the usual loop at the free end of the sling.

A further object of the invention is the provision of a hook having an enlargement provided with an eye to receive a cable forming part of a sling with a lug so disposed with respect to the eye that when the cable is engaged by such lug the weight of the suspended hook will cause the lug to aid in clamping the hook in position on a sling and for maintaining said hook in an elevated position.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a sling constructed in accordance with the principles of my invention and shown as being applied to a cargo.

Figure 2 is a section of the eye of a hook showing the gripping means on the hook in operative relation with a cable.

Figure 3 is a similar vertical section showing the cable released from the gripping means whereby the hook may be moved along the cable of the sling.

Figure 4 is a plan view of the hook and combined gripping means.

Figure 5 is an end view of the hook and combined gripping means.

Figure 6 shows a modified form in section of the eye or channel formed in one end of the hook with the gripping means in operative relation with the cable.

Figure 7 is a similar section showing the cable released from the gripping means.

Figure 8 is a view in elevation of the combined hook and gripping means as illustrated in Figs. 6 and 7.

Figure 9 is a modified form of the gripping means in elevation with the hook pivoted on the gripping means.

Figure 10 is an end view in elevation of the combined hook and gripping means shown in Fig. 9.

Referring more particularly to the drawing, 10 designates a rope or cable which is secured to an eye 11 of a hook 12 that receives a loop 13 of a cable 14 forming part of the sling which is adapted to be disposed in embracing relation with a cargo 15 which in this case is shown as a plurality of boards stacked in horizontal relation.

The free end of the cable 14 is also provided with a loop 16 which is adapted to receive a hook 17 which is mounted for sliding movement on the cable after the cable has been inserted through an eye 18 formed centrally of an enlargement 19 at the base of the hook. The substantially flat base member 19 is located in the same plane with the hook 17.

A clamping lug 20, as shown more particularly in Figs. 3 and 5, is formed integrally with the base member and extends above the upper surface of the base member 19 and is then bent inwardly as shown at 21 towards the opening 18, but to one side of said opening. The inner or lower portion 22 of said lug is widened where it joins the upper surface of the base member 19.

When the cable 14 is inserted through the opening 18 and placed beneath curved lug 21 as shown in Fig. 2, and the hook is released the weight of the hook will tend to move said hook downwardly whereby the lug 20 will bend the cable 14 against the inclined face 23 of the inner wall of the opening 18 which is adjacent the lug 20. Particular attention is called to Figs. 2 and 3 in which the surface of the ring-shaped base member 19 is flared outwardly at 23 instead of being circular as shown at 24. This flaring of the ring portion at 23 facilitates the ready insertion of the cable between the lug 20 and the portion 23.

By this construction, as shown in Figs. 1 and 2, the hook 17 will be maintained in any one of its elevated positions along the cable after the hands of the operator has released the hook from the loop 16. Therefore, the hook will be in position to be engaged by the loop 16 when the next piece of cargo is placed in the sling formed by the cable 14, the loop 16 and the hook 17.

Referring to Figs. 6, 7 and 8, it will be seen that a modified form of the gripping means is employed. In this instance the shank 25 extending outwardly from the hook 17 is thickened so that the portion 26 which receives the cable 14 is in the form of a sleeve. The opposite ends of the hollow sleeve 26 are flared outwardly as shown at 27, 28.

An extension 29 carries the gripping lug 20a above the flared mouth 27 of the sleeve 26.

The flaring of the opposite end of the hollow sleeve 26 is provided for by curving the inner walls 30, 31 as shown in Fig. 9.

When the cable 14 is located between the lug 20a and the rounded surface 31 and the hook is free of the loop 16 the weight of the hook will tend to move it downwardly since the cable is engaged between the lug 20a and the curved surface 21 of the hollow sleeve 26 thereby providing a tortuous path for the cable 14. Said hook will be maintained in any one of its elevated positions after it has been manually released from the loop 16.

When it is desired to shift the hook 17 along the cable it is only necessary to slip the cable from beneath the lug 20 (Fig. 2) or the lug 20a (Fig. 6) so that the passage 18 (Fig. 3) or the hollow sleeve 26 will be vertically positioned so that the cable 14 will not be distorted when the hook and its connecting means is lying in approximately a horizontal position. The lug 20a bears the same relation to the passage 32 in the member 26 as does the lug 20 with respect to the passage 18 and, therefore, the same results will be had.

Referring more particularly to Figs. 9 and 10, it will be seen that substantially the same results are obtained by a modified form as that shown in Figs. 1 to 8, inclusive. In this construction a hook 40 is pivotally mounted on a pin 41 carried by a pair of legs 42 which together with a bight or bridging portion form a bail for swingably supporting the hook 40 in various positions along the cable 14 which forms the sling that is adapted to be placed around packages or pieces of cargo, as shown in Fig. 1.

The inner surface of the bridging portion is curved as shown at 44. This curved portion together with the rear portion 45 of the shank 46 of the hook 40 and the inner walls of the legs 42 form a channel 47 through which the cable 14 passes and upon which the hook and bail are slidably mounted.

A curved finger or lug 48 projects laterally from an angular portion 49 of the shank 46 and extends toward the outer edge 50 of the shank 46 and over said shank.

In this form as long as the lug 49 is not in engagement with a cable or rope 14 the bail will freely slide on said cable. However, when the cable is engaged by the lug 48 it will be distorted from its normal vertical line so that the engaged portions of the bail and the lug will cooperate to frictionally retain the bail in an elevated position on the cable 14 whenever the hook is manually released.

When it is desired to move the hook to any predetermined position along the cable 14 it is only necessary to release the lug from the cable whereby the cable may be maintained vertically within the passage of the supporting member of the hook. On the other hand when the cable is engaged by the lug 20, 20a or 48 and the hook 17 or 40 is not in engagement with the loop 16 the weight of the hook will tend to lower the hook and this inclination of the hook together with the engagement of the cable by the friction lug will prevent slippage of the hook on the cable. Otherwise the hook would slide downwardly along the cable when released. This is particularly true when the cable is being applied around a package because unless means were provided for retaining the hook in a predetermined position it would readily slide downwardly and even below the cable below the package during the time when the loop was being slipped under the package preparatory to engaging the hook with the loop.

I claim:

1. A sling hook provided with a base portion having an opening therein to receive a cable, a lug connected to the base portion at one side of the opening and having an inwardly turned free end adapted to engage around the cable for distorting it at the points of engagement with the lug and walls of the opening.

2. A sling hook provided with a base portion having an elongated opening therein to receive a cable, one end of the opening being flared, a lug connected to the base portion at one side of the center of the opening and having an inwardly turned free end adapted to engage around the cable for distorting it at the points of engagement with the lug and walls of the opening.

3. A sling hook provided with a supporting member having a passage adapted to receive a cable, a curved lug located on the supporting member outwardly of one end of the passage and to one side of the opening the opening adjacent the lug being flared so that when the cable is engaged between the flared portion and the lug it will be distorted and the hook will be held against slippage on the cable.

4. A sling hook comprising a bail, a hook, means pivotally connecting the hook with the free ends of the legs of the bail and spaced from the bight portion of the bail to provide a passage to receive a cable, a lug on the hook engageable with the cable and acting in cooperation with a wall of the passage for clamping the hook against sliding on the cable.

5. A sling hook provided with a member having a passage therein to receive a cable and also provided with a lug located outwardly from one end of said passage and to one side of a line passing through the longitudinal axis of said passage, said lug having an inturned free end adapted to engage around the cable for distorting it at the points of engagement with the lug and walls of the passage.

ALFRED M. SIGNALNESS.